United States Patent
Sato et al.

[11] Patent Number: 5,128,411
[45] Date of Patent: Jul. 7, 1992

[54] ADHESIVE RESIN COMPOSITIONS AND LAMINATES UTILIZING SAME

[75] Inventors: Koichiro Sato; Mineo Kubo, both of Yamaguchi; Mikio Nakagawa, Hiroshima, all of Japan

[73] Assignee: Mitsui Petrochemical Industries, Ltd., Tokyo, Japan

[21] Appl. No.: 733,187

[22] Filed: Jul. 19, 1991

Related U.S. Application Data

[62] Division of Ser. No. 263,923, Oct. 28, 1988, Pat. No. 5,055,526.

[51] Int. Cl.$^5$ .............. C08L 51/06; C08L 31/04; C08L 33/06; C08L 33/04
[52] U.S. Cl. ............................ 428/412; 525/73; 525/74; 525/77
[58] Field of Search .............. 525/73, 77, 78; 428/412

[56] References Cited

U.S. PATENT DOCUMENTS

| | | | |
|---|---|---|---|
| 4,376,388 | 1/1983 | Mito et al. | 525/74 |
| 4,460,632 | 7/1984 | Adur et al. | 525/74 |
| 4,670,349 | 6/1987 | Nakagawa et al. | 525/74 |
| 4,687,587 | 5/1978 | Shida et al. | 525/74 |
| 4,957,968 | 9/1990 | Ador et al. | 525/74 |
| 5,655,526 | 10/1991 | Sato et al. | 525/74 |

FOREIGN PATENT DOCUMENTS

1889014 12/1984 European Pat. Off. ............. 525/74

Primary Examiner—James J. Seidleck
Assistant Examiner—W. R. H. Clark
Attorney, Agent, or Firm—Nixon & Vanderhye

[57] ABSTRACT

In accordance with the present invention, there are provided an adhesive resin composition comprising (A) 95–50% by weight of an ethylene/α-olefin copolymer having a density of 0.850–0.900 g/cm$^3$ and the ethylene content of 75–95 mol %, (B) 5–50% by weight of a copolymer of ethylene and a radical polymerizable polar unsaturated monomer, said copolymer having the radical polymerizable polar unsaturated monomer content of 5–40% by weight, and (C) 1.0–30 parts by weight, based on 100 parts by weight of the sum of the above-mentioned (A)+(B), of a graft-modified polyethylene, a part or whole of said polyethylene has been graft-modified with an unsaturated carboxylic acid or its derivative, and a laminate using this adhesive resin composition.

2 Claims, No Drawings

ADHESIVE RESIN COMPOSITIONS AND LAMINATES UTILIZING SAME

This is a division of application Ser. No. 07/263,923, filed Oct. 28, 1988, now U.S. Pat. No. 5,055,526.

FIELD OF THE INVENTION

This invention relates to adhesive resin compositions and laminates utilizing the same and more particularly to such adhesive resin compositions as will not decrease in adhesive strength even when they come in touch with hot water and laminates utilizing the same, which are excellent in gas and moisture barrier properties and also fit for food packaging materials being resistant to heat strenzation with a retort. (retort treatment)

BACKGROUND OF THE INVENTION

Polyolefins particularly such as polypropylene are excellent in heat-sealing properties, mechanical strength and water resistance, lightweight, nontoxic, tasteless and odorless and, moreover, have heat resisting properties capable of withstanding the retort treatment. Utilizing such properties as mentioned above, polyolefins particularly such as polypropylene are widely used as packaging materials such as food packaging films, cups, bottles, etc. However, polyolefins such as polypropylene had such problems that because they are relatively high in permeability to gases such as oxygen, carbon dioxide gas, etc. and are somewhat poor in oil resistance and grease resistance, they cannot be used alone in packaging perishable food such as fish meat, edible meat or processed products thereof, food rich in fats and oils, and the like food.

In order to solve such problems as mentioned above, there has been proposed to laminate polyolefins particularly such as polypropylene with polyvinylidene chlorides or saponification products of ethylene/vinyl acetate copolymer, both of which are of excellent gas barrier and oil resistance properties. Particularly, polyvinylidene chlorides are suitable as materials for gas barrier layers of food packaging containers which require the retort treatment, because polyvinylidene chlorides are low in hydroscopicity and exhibit no decrease in gas barrier properties when used as the gas barrier layers. However, the existing circumstances were such that because polyolefins such as polypropylene have no polar groups, even when a polyolefin layer is directly laminated with a layer of polyvinylidene chloride or saponification product of ethylene/vinyl acetate copolymer, the resulting lamination layers are very low in adhesion therebetween and the laminate thus obtained is of little practical use.

As procedures for improving adhesion between a polypropylene layer and a polyvinylidene chloride layer, there have heretofore been proposed a process in which a modified polypropylene grafted with an unsaturated carboxylic acid or its derivative is used for forming a polypropylene layer (Japanese Patent Publn. No. 14970/1982) and a process in which a resin comprising a mixture of a low crystalline ethylene/α-olefin copolymer and an ethylene/vinyl acetate copolymer, at least one of which has been graft-modified with an unsaturated carboxylic acid or its derivative, is used to form an adhesive layer to be interposed between the polypropylene layer and polyvinylidene chloride layer (Japanese Patent L-O-P Publn. No. 13718/1980).

In these processes as referred to above, adhesion between the layers after the retort treatment or such high temperature treatment as high temperature filling markedly decreases, though the initial adhesion between the layers is high.

Further, polyethylene terephthalate resin is excellent in mechanical strength, rigidity, heat resistance, chemical resistance, oil resistance, transparency, etc., and widely used as packaging materials such as films, sheets, containers, etc., by utilizing these characteristics as mentioned above. However, because of its not so low permeability to gases such as oxygen, etc., such it could not be used as packaging materials for products such as food, chemicals, cosmetics and the like for which high gas barrier properties of the packaging materials are strictly required.

Furthermore, because of its not so lows permeability to gases such as oxygen, etc., polycarbonate resins could not be used as packaging materials particularly for such products as food and the like for which high gas barrier properties of the packaging materials are strictly required, though the polycarbonate resins are excellent in transparency, heat resistance, perfume barrier properties, etc., similarly to the polyester resins.

In order to improve gas barrier properties of the polyethylene terephthalate resins or polycarbonate resins, there has been proposed a procedure wherein the polyethylene terephthalate resins or polycarbonate resins are laminated with a resin which is superior in gas barrier properties to these resins, for example, saponification products of ethylene/vinyl acetate copolymers. In the proposed procedure, however, adhesion between the polyethylene terephthalate or polycarbonate resins and the ethylene/vinyl acetate copolymer saponification products is not always sufficient, and in some cases parts of the lamination layers peel off from each other at the time of lamination or use thereof, gas barrier properties of the laminate obtained decreases, or the lamination products prepared therefrom are marred in appearance or deteriorate in mechanical strength.

Japanese Patent L-O-P Publn. Nos. 270155/1986 and 158043/1987 disclose laminates which are obtained by joining polycarbonate or polyester layers to layers of saponification products of ethylene/vinyl acetate copolymers by the use as an intermediate adhesive layer of graft-modified ethylene/α-olefin copolymers graft-modified with unsaturated carboxylic acids or derivatives thereof. The disclosed laminates have excellent gas barrier properties and the layers of the laminate adhere strongly each other at ordinary temperature, However, when these laminates are subjected to heat treatment such as high temperature filling or retort treatment, adhesive strength between layers of the laminates sometimes decreases after such treatments, and on that account those layers peel off from each other and gas barrier properties of the laminates decreases.

OBJECT OF THE INVENTION

An object of the invention is to provide such adhesive resin compositions as will not substatially decrease or decrease no so much in adhesive strength even after subjected such severe treatment as high temperature filling or retort treatment.

A further object of the invention is to provide laminates by the use of the above-mentioned adhesive resin compositions, said laminates having excellent gas barrier properties and moisture barrier properties and, at the same time, having no substantial decrease or having no marked decrease in adhesive strength between the layers of laminate even when subjected to high temperature filling or retort treatment.

SUMMARY OF THE INVENTION

The adhesive resin composition of the present invention comprises
(A) 95-50% by weight of an ethylene/α-olefin copolymer having an ethylene content of 75-95% by mole and density of 0.850-0.900 g/cm$^3$,
(B) 5-50% by weight of a copolymer of ethylene and a radical polymerizable polar monomer, said copolymer having the content of the radical polymerizable polar monomer of 5-40% by weight, and
(C) 1.0-30 parts by weight, based on 100 parts by weight of the sum of the above-mentioned (A)+(B), of a graft-modified polyethylene, a part or whole of said polyethylene has been graft-modified with an unsaturated carboxylic acid or its derivative.

Such adhesive resin compositions of the present invention as mentioned above are particularly useful for joining
(i) a polyolefin layer to a polyvinylidene chloride layer,
(ii) a polyester layer to an olefin/vinyl acetate copolymer saponification product layer, and
(iii) a polycarbonate layer to an olefin/vinyl acetate copolymer saponification product layer.

Further, the first laminate of the present invention is prepared by laminating (i) a polyolefin layer through such adhesive resin composition as mentioned above with a polyvinylidene chloride layer.

The second laminate of the present invention is prepared by laminating (ii) a polyester layer through such adhesive resin composition as mentioned above with an olefin/vinyl acetate copolymer saponification product layer.

The third laminate of the present invention is prepared by laminating (iii) a polycarbonate layer through such adhesive resin composition as mentioned above with an olefin/vinyl acetate copolymer saponification product layer.

DETAILED DESCRIPTION OF THE INVENTION

The adhesive resin compositions of the present invention and laminates using the same are illustrated below in detail.

First, the adhesive resin compositions of the present invention comprise (A) an ethylene/α-olefin copolymer, (B) a copolymer of ethylene and a radical polymerizable polar unsaturated monomer, and (C) a graft-modified polyethylene. Each of the above-mentioned components is described hereinafter in detail.

(A) Ethylene/α-olefin copolymer

This ethylene/α-olefin copolymer is a random copolymer of ethylene and α-olefin, and has the following characteristics.
Melt flow rate: preferably 0.1-50 g/10 min, (ASDM D 1238 E) more preferably 0.3-30 g/10 min
Density: 0.850-0.900 g/cm$^3$ preferably 0.850-0.890 g/cm$^3$
Ethylene content: 75-95 mol %, preferably 75-90 mol %
Crystallinity index as measured by X-ray: preferably less than 30%, more preferably less than 25%

Method for measuring crystallinity index by X-ray:
(i) Preparation of sample
A sample of a sheet of a 1 mm thick is prepared by pressing the obtained product at 200° C., followed by quenching while pressing the pressed sample at 30° C.
(ii) Measurement by X-ray
A ratio of the crystallized poriton to the non-crystallized portion is calculated by diffraction patent of a wide angle X-ray (target: Cu).

If the copolymer used is found to be beyond the ranges of the above-mentioned characteristics, the resulting adhesive resin composition undesirably decreases in adhesive power.

The α-olefin used as one of the components of this ethylene/α-olefin copolymer has 3-20 carbon atoms and includes concretely propylene, 1-butene, 1-hexane, 4-methy-1-pentene, 1-octene, 1-decene, 1-tetradecene, 1-octadecene, etc., and these α-olefins may be used either singly or in admixture of two or more.

The ethylene/α-olefin copolymer as mentioned above usually has melting point (ASTM D3418) of less than 100° C.

The ethylene/α-olefin copolymer is used in an amount of 95-50% by weight, preferably 90-60% by weight, based on the total weight of this copolymer and (B) an ethylenhe/vinyl acetate copolymer as will be mentioned later.

(B) Copolymer of ethylene and a radical polymerizable polar unsaturated monomer This random copolymer of ethylene and a radical polymerizable polar unsaturated monomer includes such copolymers having the following characteristics, for example, as (i) ethylene/vinyl acetate copolymers [EVA], (ii) ethylene/ethyl acrylate copolymers [EEA], (iii) ethylene/methyl acrylate copolymers [EMA], (iv) ethylene/acrylic acid copolymers [EAA], (v) ethylene/methacrylic acid copolymers [EMAA], etc. Of these copolymers, suitably useful in the present invention are (i) ethylene/vinyl acetate copolymers, (ii) ethylene/ethyl acrylate copolymers and (iii) ethylene/methyl acrylate copolymers, and particularly preferred are (i) ethylene/vinyl acetate copolymers.

(i) Ethylene/vinyl acetate copolymers Vinyl acetate content: 4-40% by weight, preferably 10-35% by weight This ethylene/vinyl acetate copolymer is used in an amount of 5-50% by weight, preferably 10-40% by weight based on the total weight of this copolymer and the above-mentioned (A) an ethylene/α-olefin copolymer.

(ii) Ethylene/ethyl acrylate copolymers Ethyl acrylate content: 5-40% by weight, preferably 10-35% by weight This ethylene/ethyl acetate copolymer is used in an amount of 5-50% by weight, preferably 10-40% by weight based on the total weight of this copolymer and the above-mentioned (A) an ethylene/α-olefin copolymer.

(iii) Ethylene/methyl acrylate copolymers Methyl acrylate content: 5-40% by weight, preferably 10-35% by weight This ethylene/methyl acrylate copolymer is used in an amount of 5-50% by weight, preferably 10-40% by weight based on the total weight of this copolymer and the above-mentioned (A) an ethylene/α-olefin copolymer.

(iv) Ethylene/acrylic acid copolymers Acrylic acid content: 5–40% by weight, preferably 5–30% by weight, and more preferably 8–25% by weight This ethylene/acrylic acid copolymer is used in an amount of 5–50% by weight, preferably 10–40% by weight based on the total weight of this copolymer and the above-mentioned (A) an ethylene/α-olefin copolymer.

(v) Ethylene/methacrylic acid copolymer Methacrylic acid content: 5–40% by weight, preferably 5–25% by weight, and more preferably 7–20% by weight This ethylene/methacrylic acid copolymer is used in an amount of 5–50% by weight, preferably 10–40% by weight based on the total weight of this copolymer and the above-mentioned (A) an ethylene/α-olefin copolymer.

(C) Graft-modified polyethylene

This graft-modified polyethylene has the following characteristics.

Amount of unsaturated carboxylic acid or its derivative: preferably 0.05–15% by weight, more preferably 0.1–10% by weight Melt flow rate: preferably 0.1–50 g/10 min, more preferably 0.3–30 g/10 min Density: preferably 0.900–0.980 g/cm$^3$, more preferably 0.905–0.970 g/cm$^3$ Crystallinity index as measured by X-ray: preferably at least 30%, more preferably 35–75%

In this graft-modified polyethylene, a part or whole of polyethylene has been graft-modified.

Under certain circumstances, the graft-modified polyethylene may be a graft-modified ethylene/α-olefin copolymer of ethylene and at least one α-olefin, for example, propylene, 1-butene, 4-methyl-1-pentene, 1-hexene, 1-octene, 1-decene, etc., in small amounts, for example, up to 5 mol %, at least a part or whole of which has been graft-modified.

Such graft-modified polyethylene may be obtained by graft-modifying a part or whole of polyethylene or an ethylene/α-olefin copolymer with an unsaturated carboxylic acid or its derivative. In that case, the unsaturated carboxylic acid or its derivative used includes concretely unsaturated carboxylic acids such as acrylic acid, maleic acid, fumaric acid, tetrahydrophthalic acid, itaconic acid, citraconic acid, crotonic acid, isocrotonic acid, nadic acid ® (endocis-bicyclo [2, 2, 1] hepto-5-en-2,3-dicarboxylic acid), etc., or derivatives thereof, for example, acid halides, amides, imides, anhydrides, esters, etc., concretely malenyl chloride, maleimide, maleic anhydride, citraconic anhydride, monomethyl maleate, dimethyl maleate, glycidyl maleate, etc. Among these, suitable are unsaturated dicarboxylic acids or acid anhydrides thereof, and particularly useful are maleic acid, nadic acid ® or acid anhydrides thereof.

In preparing modified products by graft copolymerization of a graft monomer selected from among such unsaturated carboxylic acids or their derivatives as mentioned above with polyethylene, there can be adopted various methods, per se, known. For instance, there is a method in which a graft monomer is added to molten polyethylene and the mixture is graft copolymerized or a method in which a graft monomer is added to a solvent solution of polyethylene and the mixture is graft copolymerized. In either case, it is desirable to carry out the reaction in the presence of a radical initiator in order to efficiently effect the graft copolymerization of the above-mentioned graft monomer with polyethylene. The graft reaction is carried out usually at a temperature of 60°–350° C. The proportion of the radical initiator used is usually in the range of from 0.001 to 1 part by weight based on 100 parts by weight of polyethylene. Useful radical initiators include organic peroxides, organic peresters, for example, benzoyl peroxide, dichlorobenzoyl peroxide, dicumyl peroxide, di-tert-butyl peroxide, 2,5-dimethyl-2,5-di (peroxidibenzoate)hexine-3, 1,4-bis(tert-butylperoxyisopropyl)benzene, lauroyl peroxide, tert-butylperacetate, 2,5-dimethyl-2,5-di(tert-butylperoxy)hexine-3, 2,5-dimethyl-2,5-di(tert-butylperoxy)hexane, tert-butyl perbenzoate, tert-butyl perphenyl acetate, tert-butyl perisobutyrate, tert-butyl per-sec-octoate, tert-butyl perbivalerate, cumyl perbivalerate and tert-butyl perdiethyl acetate, and azo compounds such as azobisisobutyronitrile, dimethyl azoisobutyrate, etc. Among these, preferred are dialkylperoxides such as dicumyl peroxide, di-tert-butyl peroxide, 2,5-dimethyl-2,5-di(tert-butylperoxy)hexine-3, 2,5-dimethyl-2,5-(tert-butylperoxy)hexane, 1,4-bis(-tert-butylperoxyisopropyl)benzene, etc.

This graft-modified polyethylene is used in an amount of 1–30 parts by weight, preferably 2–28 parts by weight based on 100 parts by weight of the total weight of the above-mentioned (A) an ethylene/α-olefin copolymer and (B) a copolymer of ethylene and a radical polymerizable polar unsaturated monomer.

In the manner now described, the adhesive resin compositions of the present invention, which are used therein, comprise (A) an ethylene/α-olefin copolymer, (B) a copolymer of ethylene and a radical polymerizable polar unsaturated monomer and (C) a graft-modified polyethylene as aforesaid, said adhesive resin compositions as a whole containing a grafted monomer of usually 0.01–3% by weight, preferably 0.05–2.5% by weight, this grafted monomer being derived from the above grafted-modified polyethylene (c) a melt flow rate of preferably 0.1–50 g/10 min, more preferably 0.3–30 g/10 min, and a crystallinity index of preferably less than 35%, more preferably less than 30%.

The adhesive resin compositions of the present invention as illustrated above may be prepared by treating the above-mentioned components (A), (B) and (C), each falling within the above-mentioned range, by various known methods, for example, by mixing these components together with a Henschel mixer, v-blender, ribbon blender, tumbler blender, etc., or melt kneading the resulting mixture with a single roll extruder, twin roll extruder, kneader, Banbury mixer, etc. followed by granulating or pulverizing.

In addition to the above-mentioned components, the adhesive resin compositions of the present invention can also be incorporated with heat stabilizers, weathering agents, antistatic agents, pigments, dyes, rust preventives, etc. in such ranges where no objects of the invention are hindered.

The adhesive resin compositions containing the above-mentioned (A) an ethylene/α-olefin copolymer, (B) a copolymer of ethylene and a radical polymerizable polar unsaturated monomer and (C) a graft-modified polyethylene are preferably used for joining particularly (i) a polyolefin layer to a polyvinylidene chloride layer, (ii) a polyester layer to an olefin/vinyl acetate copolymer saponification product layer, and (iii) a polycarbonate layer to an olefin/vinyl acetate copolymer saponification product layer.

The laminates of the present invention prepared by the use of such adhesive resin compositions as illustrated above are described in detail hereinafter.

The first laminate of the present invention is basically composed of a polypropylene layer (X-1)/an adhesive layer (Y)/a polyvinylidene chloride layer (Z-1). So long as any laminate has this basic structure of (X-1)/(Y)/(Z-1), the present invention further includes a laminate having a structure of (X-1)/(Y)/(Z-1)/(X-1). Furthermore, such laminates as having the above-mentioned structures to which a ribro layer (W) comprising a mixture of (X-1), (Y) and (X-1) has been added, that is, those having such structures as (X-1)/(W)/(Y)/(Z-1), (X-1)/(W)/(Y)/(Z-1)/(Y)/(X-1) and (X-1)/(W)/(Y)/(Z-1)/(Y)/(W)/(X-1) may also be included in the scope of the first laminate of the present invention.

Polypropylene constituing (X-1) layer

Polypropylene used for constituting the first laminate of the present invention includes concretely propylene homopolymer (so-called homopolypropylene), propylene random copolymers of propylene and α-olefins such as propylene/ethylene random copolymers, propylene/1-butene random copolymers, etc., and propylene block copolymers of propylene and α-olefins such as ethylene.

The polypropylenes usually used in the present invention for forming the (X-1) layer are those having a melt flow rate (ASTM D 1238L) in the range of 0.01-200 g/10 min, preferably 0.1-100 g/10 min.

Polyvinylidene chloride constituting (Z-1) layer

Polyvinylidene chloride useful for constituting (Z-1) layer of the first laminate of the present invention are copolymers of vinylidene chloride as a principal component and acrylonitrile, vinyl chloride, acrylates or methacrylates.

Adhesive resin composition constituting (Y) layer

The adhesive resin composition used for constituting adhesive layer (Y) of the first laminate of the present invention is composed, as mentioned previously in detail, of (A) an ethylene/α-olefin copolymer, (B) a copolymer of ethylene and a radical polymerizable polar unsaturated monomer and (C) a graft-modified polyethylene.

Further, the second laminate of the present invention is composed of a polyester layer (X-2)/an adhesive layer (Y)/an olefin/vinyl acetate copolymer saponification product layer (Z-2). In the same manner as in the case of the first laminate of the present invention, however, this second laminate may have a structure different from the above-mentioned one, for example, (X-2)/(Y)/(Z-2)/(Y)/(X-2).

Polyester resin constituting (X-2) layer

The polyester resins are polyesters which are formed from aliphatic glycol such as ethylene glycol, propylene glycol, 1,4-butanediol, neopentyl glycol, hexamethylene glycol, etc., alicyclic glycol such as cyclohexane dimethanol, etc., aromatic dihydroxy compound such as bisphenol, etc., or dihydroxy compound unit selected from amount at least two compounds mentioned above, and aromatic dicarboxylic acid such as terephthalic acid, isophthalic acid, 2,6-naphthalenedicarboxylic acid, etc., aliphatic dicarboxylic acid such as oxalic acid, succinic acid, adipic acid, sebacic acid, undecadicarboxylic acid, etc., or dicarboxylic acid unit selected from among at least two acids mentioned above. So long as the polyester resins exhibit thermoplasticity, they may be modified with a small amount of polyhydroxy compound exhibiting at least three valences such as triol or tricarboxylic acid, or carboxylic acid. Useful as these thermoplastic polyesters are concretely polyethylene terephthalate, polybutylene terephthalate, polyethylene isophthalate/terephthalate copolymers, etc.

Olefin/vinyl acetate copolymer saponification product constituting (Z-2) layer The olefin/vinyl acetate copolymer saponification products used in the present invention are those obtained by saponifying an olefin/vinyl acetate copolymer having the olefin content of 15–60 mol %, preferably 25–50 mol %, so that a saponification degree of the saponified product becomes at least 50%, preferably at least 90%. If the saponification products obtained have the olefin content of less than 15 mol %, they are not desirable, because they are liable to heat decomposition, involve difficulty in the melt molding thereof, and they are also poor in stretchability and become poor in water resistance as they absorb water and are apt to swell. On one hand, if the above-mentioned olefin content exceeds 60 mol %, the saponification products obtained are not desirable, because they become poor in gas barrier properties. Furthermore, the saponification products are undesirable if they have a saponification degree of less than 50%, because they become poor in gas barrier properties.

Preferably useful olefins which are copolymerizable with vinyl acetate include concretely ethylene, propylene, 1-butene, 1-hexene, 4-methyl-1-pentene, 1-octene, 1-decene, 1-tetracene and 1-octadecene, and among these, particularly preferred is ethylene from the standpoint of mechanical strength and moldability.

The adhesive layer (Y) used in the second laminate of the present invention is such adhesive layer (Y) as aforementioned.

Next, the third laminate of the present invention is composed of a polycarbonate layer (X-3)/an adhesive layer (Y)/an olefin/vinyl acetate copolymer saponification product layer (Z-2). In the same manner as in the case of the first laminate of the present invetion, however, the third laminate of the invention may have such structure, for example, as (X-3)/(Y)/(Z-2)/(Y)/(X-3), etc.

Polycarbonate resin constituting (X-3) layer

The polycarbonate resins used herein include various polycarbonates and copolycarbonates which are obtained by reacting, according to the known method, dihydroxy compounds with phosgene or diphenyl carbonate. The dihydroxy compounds include hydroquinone, resorcinol, 4,4'-dihydroxy-diphenyl-methane, 4,4'-dihydroxy-diphenylethane, 4,4'-dihydroxy-diphenyl-n-butane, 4,4'-dihydroxydiphenyl-heptane, 4,4'-dihydroxy-diphenyl-phenyl-methane, 4,4'-dihydroxy-diphenyl-2,2-propane(bisphenol A), 4,4'-dihydroxy-3,3'-dimethyl-diphenyl-2,2-propane, 4,4'-dihydroxy-3,3'-diphenyl-diphenyl-2,2-propane, 4,4'-dihydroxy-dichloro-diphenyl-2,2-propane, 4,4'-dihydroxydiphenyl-1,1-cyclopentane, 4,4'-dihydroxy-diphenyl-1,1-cyclohexane, 4,4'-dihydroxy-diphenyl-methyl-phenylmethane, 4,4'-dihydroxy-diphenyl-ethyl-phenyl-methane, 4,4'-dihydroxy-diphenyl-2,2,2-trichloro-1,1- ethane, 2,2'-dihydroxydiphenyl, 2,6-dihydroxynaphthalene, 4,4'-dihydroxydiphenyl ether, 4,4'-dihydroxy-3,3'-dichlorodiphenyl ether and 4,4'-dihydroxy-2,5-diethoxyphenyl ether. The polycarbonates obtained by using 4,4'-dihydroxy-diphenyl-2,2-propane(bisphenol A) are preferred because they are excellent in mechanical properties and transparency.

The olefin/vinyl acetate copolymer saponification product layer (Z-2) and adhesive layer (Y) used in the third laminate of the present invention are the same as those illustrated already hereinbefore.

Further, the adhesive resin compositions of the present invention can also be used for joining (iv) a polyester layer to polyvinylidene chloride layer, (v) a polycarbonate layer to a polyvinylidene chloride layer, and (vi) a polyolefin layer to an olefin/vinyl acetate copolymer saponification product layer. Accordingly, by virtue of using the adhesive resin compositions of the present invention, there are obtained laminate comprising a polyester layer/adhesive layer/polyvinylidene chloride layer, a laminate comprising a polycarbonate layer/adhesive layer/polyvinylidene chloride layer and further a laminate comprising a polyolefin layer/adhesive layer/olefin/vinyl acetate copolymer saponification product layer.

Preparation of laminate

The laminates of the present invention may be prepared by various known methods. For instance, when the laminate to be prepared is in the form of film or sheet, there may be mentioned a method wherein the resin to constitute (X) layer, the adhesive resin composition to constitute (Y) layer and the resin to constitute (Z) layer are individually melt extruded through separate extruders and fed to a die of three-layer structure, whereby these three components are co-extrusion molded so that the adhesive resin composition is positioned as an intermediate layer, a so-called sandwich lamination method wherein the adhesive resin composition is melt extruded in between the previously formed (X) layer and (Z) layer, and a so-called co-extrusion laminate method wherein the resin to constitute (X) layer and the adhesive resin composition to constitute (Y) layer are melted with separate extruders, extruded through a die of two-layer structure to form two layers, and the two layers are individually laminated on each of both sides of the previously formed (Z) layer. Further, when the laminate to be prepared is in the form of bottle, leg, pipe or tube, there may be adopted a co-extrusion molding method. Furthermore, when (X) layer or (Z) layer has been previously formed, these layer may be mono- or biaxially oriented.

A film thickness of each layer of the laminates of the present invention may be decided in various ways according to the purpose for which the laminate is used. Usually, however, the film thickness is preferably 0.02–5 mm in (X) layer, 0.01–1 mm in (Y) layer, and 0.01–1 mm in (Z) layer.

The adhesive resin compositions of the present invention exhibit excellent adhesive power, particularly they do not decrease in their adhesive power even when they come in contact with water at elevated temperatures. Accordingly, when a polyolefin layer is joined to a polyvinylidene chloride layer by using the adhesive resin compositions, there is obtained a laminate which is not only excellent in gas barrier properties and moisture barrier properties.

The present invention is illustrated below with reference to examples, but it should be construed that the invention is in no way limited to those examples.

EXAMPLE 1

Composition (I) was prepared by mixing together 75 parts by weight of an ethylene/propylene random copolymer (hereinafter called EPR-1; a melt flow rate (MFR) 1.0 g/10 min, ethylene content 80 mol %, density 0.865/cm$^3$, crystallinity index 4%), 25 parts by weight of an ethylene/vinyl acetate copolymer (hereinafter called EVA-1; MFR 2.5 g/10 min, vinyl acetate content 25% by weight) and 20 parts by weight of a maleic anhydride-modified polyethylene (hereinafter called MAH-PE-1; MFR 1.0 g/10 min, density 0.925 g/cm$^3$, crystallinity index 52%, butene content 3.6 mol %, graft amount of maleic anhydride 1.0 g/100 g polymer), the graft amount of maleic anhydride, crystallinity index and MFR of said composition (I) being 0.2 g/100 g polymer, 15% and 1.2 g/10 min, respectively. Subsequently, the composition (I) thus prepared was formed by the compression molding method into a sheet of 150 in thickness. Subsequently, on both sides of the sheet thus formed were laminated a polyvinylidene chloride (PVDC-1) [a product of Dow Chemical (U.S.) sold under a trade name of SARAN X05253-16] layer (Z) of 150 μmin thickness and a homopolypropylene (hereinafter called PP-1; MFR 6.0 g/10 min) layer (X) of 150 μmin thickness so that the sheet of the composition (I) becomes an intermediate layer (Y). Leaving a part of the laminate thus prepared behind for peeling test, the remaining laminate was heat sealed at a temperature of 230° C., a heating time of 3 seconds and a pressure of 1 kg/cm$^2$ to form a three-layer laminate comprising PVDC-1 layer/composition (I) layer/PP-1 layer. Test specimens of 15 mm in width were cut off from this three-layer laminate, and the initial adhesion strength between the PVDC-1 layer and composition (I) layer, and the initial adhesion strength between the composition (I) layer and PP-1 layer were measured by means of a T-peel tester (peeling speed 300 mm/min, measurement temperature 23°).

The results obtained are shown in Table 1.

Subsequently, the test specimens of 15 mm in width obtained above were subjected to heat treatment with an autoclave for 1 hour at 131° C., and the adhesion strength between the layers was measured in the same manner as in the peel test with the above-mentioned T-peel tester.

The results obtained are shown in Table 1.

EXAMPLE 2

Example 1 was repeated except that in place of the composition (I) used therein, there was used a composition comprising a mixture of 75 parts by weight of an ethylene/1-butene random copolymer (hereinafter called EBR-1; MMFR 3.0 g/10 min, ethylene content 90 mol %, density 0.885 g/cm$^3$, crystallinity index 14%), 25 parts by weight of EVA-1 and 20 parts by weight of MAH-PE-1, the graft amount of maleic anhydride, crystallinity index and MFR of said composition being 0.17 g/100 g polymer, 21% and 2.4 g/10 min, respectively, and in place of the PP-1, there was used a propylene random copolymer (hereinafter called PP-2; MFR 6.2 g/10 min, ethylene content 4 mol %).

The results obtained are shown in Table 1.

EXAMPLE 3

Example 1 was repeated except that in place of the composition (I) used therein, there used a composition comprising a mixture of 75 parts by weight of an ethylene/1-butene copolymer (hereinafter called EBR-2; MFR 2.0 g/10 min, ethylene contents 93 mol %, density 0.892 g/cm$^3$, crystallinity index 22%), 25 parts by weight of EVA-1 and 20 parts by weight of MAH-PE-1, the graft amount of maleic anhydride, crystallinity index and MFR of said composition being 0.17 g/100 g polymer, 27% and 1.9 g/10 min, respectively.

The results obtained are shown in Table 1.

EXAMPLE 4

Example 1 was repeated except that in place of the composition used therein, there used a composition comprising a mixture of 65 parts by weight of EPR-1, 35 parts by weight of an ethylene/vinyl acetate copolymer (hereinafter called EVA-2; MFR 2.0 g/10 min, vinyl acetate content 10% by weight), and 25 parts by weight of a maleic anhydride graft-modified polyethylene (hereinafter called MAH-PE-2; MFR 3.5 g/10 min, density 0.910 g/cm$^3$, cristallinity index 40%, butene content 5.5 mol %, graft amount of maleic anhydride 0.5 g/100 g polymer), the graft amount of maleic anhydride, crystallinity index and MFR of said composition being 0.1 g/100 g of polymer, 20% and 1.6 g/10 min.

The results obtained are shown in Table 1.

EXAMPLE 5

Example 1 was repeated except that in place of the composition (I) used therein, there was used a composition comprising a mixture of 75 parts by weight of EPR-1, 25 parts by weight of EVA-1 and 5 parts by weight of a maleic anhydride graft-modified polyethylene (hereinafter called MAH-PE-3; MFR 4.3 g/10 min, density 0.962 g/cm$^3$, crystallinity index 72%, butene content 0.5 mol %, graft amount of maleic anhydride 2.2 g/100 g polymer), the graft amount of maleic anhydride, crystallinity index and MFR of said composition being 0.11 g/100 g polymer, 11% and 3 g/10 min, respectively.

The results obtained are shown in Table 1.

EXAMPLE 6

Example 1 was repeated except that in place of the composition (I) used therein, there was used a composition comprising a mixture of 85 parts by weight of EPR-1, 15 parts by weight of EVA-1 and 5 parts by weight of MAH-PE-3, the graft amount of maleic anhydride, crystallinity index and MFR of said composition being 0.11 g/100 g polymer, 9% and 1.2 g/10 min, respectively, and in place of PP-1, there was used a propylene block copolymer (hereinafter called PP-3; MFR 5.5 g/10 min).

The results obtained are shown in Table 1.

EXAMPLE 7

Example 1 was repeated except that in place of the composition (I) used therein, there was used a composition comprising a mixture of 75 parts by weight of an ethylene/propylene random copolymer (hereinafter called EPR-2; MFR 12 g/10 min, ethylene content 80 mol %, density 0.865 g/cm$^3$, crystallinity index 4%), 25 parts by weight of an ethylene/vinyl acetate copolymer (hereinafter called EVA-3; MFR 15 g/10 min, vinyl acetate content 28%) and 15 parts by weight of MAH-PE-3, the graft amount of maleic anhydride, crystallinity index and MFR of said composition being 0.29 g/100 g polymer, 15% and 11 g/10 min, respectively.

The results obtained are shown in Table 1.

EXAMPLE 8

Example 1 was repeated except that in place of the composition (I) used therein, there was used a composition comprising a mixture of 75 parts by weight of EPR-1, 25 parts by weight of an ethylene/ethyl acrylate copolymer (hereinafter called EEA-1; MFR 5 g/10 min, ethyl acrylate content 25% by weight) and 5 parts by weight of MAH-PE-3, the graft amount of maleic anhydride, crystallinity index and MFR of said composition being 0.11 g/100 g polymer, 11% and 1.4 g/10 min.

The results obtained are shown in Table 1.

COMPARATIVE EXAMPLE 1

Example 1 was repeated except that in place of the composition (I) used therein, there was used a composition comprising a mixture of 100 parts of EPR-1 and 25 parts by weight of MAH-PE-1, the graft amount of maleic anhydride, crystallinity and MFR of said composition being 0.2 g/100 g polymer, 14% and 1.0 g/10 min, respectively.

The results obtained are shown in Table 1.

COMPARATIVE EXAMPLE 2

Example 1 was repeated except that in place of the composition (I) used therein, there was used a composition comprising a mixture of 80 parts by weight of EPR-1 and 20 parts by weight of EVA-1, the graft amount of maleic anhydride, crystallinity and MFR of said composition being 0 g/100 g polymer, 7% and 1.2 g/10 min, respectively.

The results obtained are shown in Table 1.

COMPARATIVE EXAMPLE 3

Example 1 was repeated except that in place of the composition (I) used therein, there was used a composition comprising a mixture of 100 parts by weight of EVA-1 and 25 parts by weight of MAH-PE-1, the graft amount of maleic anhydride, crystallinity index and MFR of said composition being 0.2 g/100 g polymer, 25% and 2.1 g/10 min, respectively.

The results obtained are shown in Table 1.

COMPARATIVE EXAMPLE 4

Example 1 was repeated except that in place of the composition (I) used therein, there was used MAH-EPR-1 (MFR 0.5 g/10 min, ethylene content 80 mol %, density of 0.865 g/cm$^3$, graft amount of maleic anhydride 0.5 g/100 g polymer.

The results obtained are shown in Table 1.

COMPARATIVE EXAMPLE 5

Example 1 was repeated except that in place of the composition (I) used therein, there was used MAH-EVA-1 (MFR 1.2 g/10 min, content of vinyl acetate 25% by weight, crystallinity index 18%, graft amount of maleic anhydride 0.5 g/100 g polymer).

The results obtained are shown in Table 1.

COMPARATIVE EXAMPLE 6

Example 1 was repeated except that in place of the composition (I) used therein, there was used a composition comprising a mixture of 70 parts by weight of MAH-EPR-1 and 30 parts by weight of MAH-EVA-1, the graft amount of maleic anhydride, crystallinity index and MFR of said composition being 0.5 g/100 g polymer, 8% and 0.7 g/10 min, respectively.

The results obtained are shown in Table 1.

Extruder: 65 mm φ Extruder 280° C. (for PC), 40 mm φ Extruder 250° C. (for (I)), 40 mm φ Extruder 210° C. (for EVOH)

The five-layer bottle thus obtained was tested with a T-peel tester for interfacial adhesion strength (FPC,

TABLE 1

|  | Adhesion strength between (I) layer and PVDC layer [g/15 mm] | | Adhesion strength between (I) layer and PP layer [g/15 mm] | |
| --- | --- | --- | --- | --- |
|  | Initial adhesion strength between layers | Adhesion strength between layers after heat treatment | Initial adhesion strength between layers | Adhesion strength between layers after heat treatment |
| Example 1 | 2700 | 2700 | 2500 | 2600 |
| Example 2 | 2100 | 1600 | 2300 | 2300 |
| Example 3 | 1800 | 1200 | 2000 | 1900 |
| Example 4 | 1800 | 1500 | 1900 | 2000 |
| Example 5 | 2700 | 2800 | 2600 | 2600 |
| Example 6 | 2600 | 2000 | 2500 | 2400 |
| Example 7 | 2200 | 2400 | 2300 | 2200 |
| Example 8 | 2200 | 1000 | 2100 | 1500 |
| Comp. Ex. 1 | 2000 | 400 | 2300 | 2000 |
| Comp. Ex. 2 | 800 | 300 | 2100 | 1700 |
| Comp. Ex. 3 | 2700 | 2200 | 2000 | 300 |
| Comp. Ex. 4 | 2500 | 200 | 2300 | 1800 |
| Comp. Ex. 5 | 2700 | 1900 | 2100 | 100 |
| Comp. Ex. 6 | 2600 | 400 | 2200 | 800 |

EXAMPLE 9

Example 1 was repeated except that in place of the composition (I) used therein, there was used a composition comprising a mixture of 75 parts by weight of EPR-1, 25 parts by weight of EVA-1 and 5 parts by weight of MAH-PE-3, and in place of the PP-1, there was used a low density polyethylne (hereinafter called LDPE-1; MFR 2.0 g/10 min, density 0.920 g/cm³).

The results obtained are shown in Table 2.

EXAMPLE 10

Example 1 was repeated except that in place of the composition (I) used therein, there was used a composition comprising a mixture of 80 parts by weight of EBR-1, 20 parts by weight of EVA-1 and 5 parts by weight of MAH-PE-3, and in place of the PP-1, there was used LDPE-1.

The results obtained are shown in Table 2.

g/15 mm) between PC layer and (I) layer and interfacial adhesion strength (FEVOH, g/15 mm) between EVOH layer and (I) layer. Further, this bottle was filled with hot water kept at 90° C., formed with hand, and the hot water was discharged therefrom to inspect visually occurrence of interfacial peeling of this bottle. The results obtained are shown in Table 3.

Subsequently, a five-layer sheet was formed by using the composition (I), the above-mentioned EVOH and polyethylene terephthalate (hereinafter called PET; a product of Mitsui PET K.K. sold under a trade name of J-135 to which a crystallization accelerator has been added) under the following conditions.

Sheet structure: PET/(I)/EVOH/(I)/PET
Film thickness of layer (μm): 150/50/50/50/150
Extruder: 65 mm φ Extruder 280° C. (for PET), 40 mm φ Extruder 250° C. (for (I)), 40 mm φ Extruder 210° C. (for EVOH)

The sheet thus obtained was vacuum formed at a

TABLE 2

|  | Adhesion strength between (I) layer and PVDC layer [g/15 mm] | | Adhesion strength between (I) layer and LDPE layer [g/15 mm] | |
| --- | --- | --- | --- | --- |
|  | Initial adhesion strength between layers | Adhesion strength between layers after heat treatment | Initial adhesion strength between layers | Adhesion strength between layers after heat treatment |
| Example 9 | 2700 | 2800 | Not peeled | Not peeled |
| Example 10 | 2600 | 100 | Not peeled | Not peeled |

EXAMPLE 11

The composition (I) obtained in Example 1, polycarbonate (hereinafter called PC; a product of Teijin Kasei K.K. sold under a trade name of TEIJIN PANLITE L-1250 and an ethylene/vinyl acetate copolymer saponification product (hereinafter called EVOH; MFR 1.3 g/10 min, density 1.19 g/cm³, ethylene content 32 mol %; a product of Kuraray Co., Ltd. sold under a trade name of KURARAYEVAL, EP-F) were laminated together under the following conditions to obtain a five-layer bottle.

Bottle structure: PC/(I)/EVOH/(I)/PC
Film thickness of layer (μm): 200/50/50/50/200
Bottle shape: 200 cc Cylindrical bottle mold temperature of 160° C. into the form of cup, whereby the PET layer was crystallized. The cup obtained was limbed from it wall side to obtain interfacial adhesion strength (FPET, g/15 mm) between PET layer and (I) layer, and interfacial adhesion strength (FEVOH, g/15 mm) between EVOH layer and (I) layer. Further, this cup was filled with hot water kept at 90° C., the cup was deformed with hand and the hot water was discharged therefrom to inspect visually occurrence of interfacial peeling of the cup.

The results obtained are shown in Table 3.

EXAMPLE 12

Example 11 was repeated except that in place of the composition (I) used therein, there was used a composition comprising a mixture of 75 parts by weight of an ethylene/1-butene random copolymer (hereinafter called EBR-1; MFR 3.0 g/10 min, ethylene content 90 mol %, density 0.885/cm³, crystallinity index 14%), 25 parts by weight of EVA-1 and 20 parts by weight of MAH-PE-1, the graft ratio of maleic anhydride, crystallinity index and MFR of said composition being 0.17 g/100 g polymer, 21% and 2.4 g/10 min, respectively.

The results obtained are shown in Table 3.

EXAMPLE 13

Example 11 was repeated except that in place of the composition (I) used therein, there was used a composition comprising a mixture of 75 parts by weight of an ethylene/1-butene random copolymer (hereinafter called EBR-2; MFR 2.0 g/10 min, ethylene content 93 mol %, density 0.892 g/cm³, crystallinity index 22%), 25 parts by weight of EVA and 20 parts by weight of MAH-PE-1, the graft amount of maleic anhydride, crystallinity index and MFR of said composition being 0.17 g/100 g polymer, 27% and 1.9 g/10 min, respectively.

The results obtained are shown in Table 3.

EXAMPLE 14

Example 11 was repeated except that in place of the composition (I) used therein, there was used a composition comprising a mixture of 65 parts by weight of EPR-1, 35 parts by weight of an ethylene/vinyl acetate copolymer (hereinafter called EVA-2; MFR 2.0 g/10 min, vinyl acetate content 10% by weight) and 25 parts by weight of a maleic anhydride graft-modified polyethylene (hereinafter called MAH-PH-2; MFR 3.5 g/10 min, density 0.910 g/cm³, crystallinity index 40%, butene content 5.5 mol %, graft amount of maleic anhydride 0.5 g/100 g polymer), the graft ratio of maleic anhydride, crystallinity index and MFR of said composition being 0.1 g/100 g polymer, 20% and 1.6 g/10 min, respectively.

The results obtained are shown in Table 3.

EXAMPLE 15

Example 11 was repeated except that in place of the composition (I) used therein, there was used a composition comprising a mixture of 75 parts by weight of EPR-1, 25 parts by weight of EVA-1 and 5 parts by weight of a maleic anhydride graft-modified polyethylene (hereinafter called MAH-PE-3; MFR 4.3 g/10 min, density 0.962 g/cm³, crystallinity index 72%, butene content 0.5 mol %, graft amount of maleic anhydride 2.2 g/100 g polymer), the graft amount of maleic anhydride, crystallinity index and MFR of said composition being 0.11 g/100 g polymer, 11% and 1.3 g/10 min, respectively.

The results obtained are shown in Table 3.

EXAMPLE 16

Example 11 was repeated except that in place of the composition (I) used therein, there was used a composition comprising 85 parts by weight of EPR-1, 15 parts by weight of EVA and 5 parts by weight of MAH-PE-3, the graft ratio of maleic anhydride, crystallinity index and MFR of said composition being 0.11 g/100 g polymer, 9% and 1.2 g/10 min, respectively.

The results obtained are shown in Table 3.

EXAMPLE 17

Example 11 was repeated except that in place of the composition (I) used therein, there was used a composition comprising a mixture of 75 parts by weight of an ethylene/propylene random copolymer (hereinafter called EPR-2; MFR 12 g/10 min, ethylene content 80 mol %, density 0.865 g/cm³, crystallinity index 4%), 25 parts by weight of an ethylene/vinyl acetate copolymer (hereinafter called EVA-3; MFR 15 g/10 min, vinyl acetate content 28% by weight) and 15 parts by weight of MAH-PE-3, the graft amount of maleic anhydride, crystallinity index and MFR of said composition being 0.29 g/100 g polymer, 15% and 11 g/10 min, respectively.

The results obtained are shown in Table 3.

COMPARATIVE EXAMPLE 7

Example 9 was repeated except that in place of the composition (I) used therein, there was used a composition comprising a mixture of 100 parts by weight of EPR-1 and 25 parts by weight of MAH-PE-1, the graft ratio of maleic anhydride, crystallinity index and MFR of said composition being 0.2 g/100 g polymer, 14% and 1.0 g/10 min, respectively.

The results obtained are shown in Table 3.

COMPARATIVE EXAMPLE 8

Example 9 was repeated except that in place of the composition (I) used therein, there was used a composition comprising a mixture of 80 parts by weight of EPR-1 and 20 parts by weight of EVA, the graft amount of maleic anhydride, crystallinity index and MFR of said composition being 0 g/100 g polymer, 7% and 1.2 g/10 min, respectively.

The results obtained are shown in Table 3.

COMPARATIVE EXAMPLE 9

Example 9 was repeated except that in place of the composition (I) used therein, there was used a composition comprising a mixture of 100 parts by weight of EVA-1 and 25 parts by weight of MAH-PE-1, the graft amount of maleic anhydride, crystallinity index and MFR of said composition (X) being 0.2 g/100 g polymer, 25% and 2.1 g/10 min, respectively.

The results obtained are shown in Table 3.

COMPARATIVE EXAMPLE 10

Example 9 was repeated except that in place of the composition (I) used therein, there was used MAH-EPR-1 (MFR 0.5 g/10 min, ethylene content 80 mol %, density 0.865 g/cm³, crystallinity index 4%, graft amount of maleic anhydride 0.5 g/100 g polymer).

The results obtained are shown in Table 3.

COMPARATIVE EXAMPLE 11

Example 9 was repeated except that in place of the composition (I) used therein, there was used MAH-EVA-1 (MFR 1.2 g/10 min, vinyl acetate content 25% by weight, crystallinity index 18%, graft amount of maleic anhydride 0.5 g/100 g polymer).

The results obtained are shown in Table 3.

COMPARATIVE EXAMPLE 12

Example 9 was repeated except that in place of the composition (I) used therein, there was a composition comprising 70 parts by weight of MAH-EPR-1 and 30 parts by weight of MAH-EVA-1, the graft ratio of maleic anhydride, crystallinity index and MFR of said composition being 0.5 g/100 g polymer, 8% and 0.7 g/10 min, respectively.

The results obtained are shown in Table 3.

TABLE 3

| | PC/EVOH multilayered bottle | | | PET/EVOH multilayered bottle | | |
|---|---|---|---|---|---|---|
| | FPC | FEVOH | Peeling at the time of hot water filling | FPET | FEVOH | Peeling at the time of hot water filling |
| Example 11 | 2500 | Not peeled | ○ | 1700 | Not peeled | ○ |
| Example 12 | 2000 | Not peeled | ○ | 1400 | Not peeled | ○ |
| Example 13 | 1200 | Not peeled | ○ | 1100 | Not peeled | ○ |
| Example 14 | 1400 | Not peeled | ○ | 1400 | Not peeled | ○ |
| Example 15 | 2500 | Not peeled | ○ | 1900 | Not peeled | ○ |
| Example 16 | 2300 | Not peeled | ○ | 1500 | Not peeled | ○ |
| Example 17 | 2100 | Not peeled | ○ | 1500 | Not peeled | ○ |
| Comp. Ex. 7 | 800 | Not peeled | X | 700 | Not peeled | X |
| Comp. Ex. 8 | * | Peeled | X | * | Peeled | X |
| Comp. Ex. 9 | 400 | 350 | X | 350 | 300 | X |
| Comp. Ex. 10 | 2300 | Not peeled | X | 1700 | Not peeled | X |
| Comp. Ex. 11 | 1100 | 800 | X | 1000 | 700 | X |
| Comp. Ex. 12 | 1800 | Not peeled | X | 1600 | Not peeled | X |

*No measurement is made as EVOH interface peels selectively.

What is claimed is:

1. A laminate comprising a polycarbonate layer and a layer of an olefin/vinyl acetate saponification product laminated through an intermediate layer comprising an adhesive resin composition containing the following components;
   (A) 95–50% by weight of an ethylne/α-olefin copolymer having a density of 0.850–0.900 g/cm³ and the ethylene content of 75–95 mol %,
   (B) 5–50% by weight of a copolymer of ethylene and a radical polymerizable polar unsaturated monomer, said copolymer having the content of the radical polymerizable polar unsaturated monomer of 5–40% by weight, and
   (C) 1.0–30 parts by weight, based on 100 parts by weight of the sum of the above-mentioned (A)+(B), of a graft-modified polyethylene, a part or whole of said polyethylene has been graft-modified with an unsaturated carboxylic acid or its derivative.

2. The laminate as claimed in claim 1 wherein the copolymer (B) of ethylene and a radical polymerizable polar unsaturated monomer is a copolymer selected from the group consisting of ethylene/vinyl acetate copolymers, ethylene/ethyl acrylate copolymers, ethylene/methyl acrylate copolymers, ethylene/acrylic acid copolymers and ethylene/methacrylic acid copolymers.

* * * * *